US012659253B2

(12) United States Patent
Ashino et al.

(10) Patent No.:   US 12,659,253 B2
(45) Date of Patent:     Jun. 16, 2026

(54) APPARATUS, METHOD, AND RECORDING MEDIUM FOR MEASURING TIME OF TRANSMISSION BY TRANSMITTING AND RECEIVING PACKETS

(71) Applicant: NEC Corporation, Tokyo (JP)

(72) Inventors: Yuki Ashino, Tokyo (JP); Takashi Hitani, Tokyo (JP); Miyu Yakumaru, Tokyo (JP)

(73) Assignee: NEC CORPORATION, Tokyo (JP)

( * ) Notice: Subject to any disclaimer, the term of this patent is extended or adjusted under 35 U.S.C. 154(b) by 115 days.

(21) Appl. No.: 18/372,245

(22) Filed: Sep. 25, 2023

(65) Prior Publication Data

US 2024/0113955 A1     Apr. 4, 2024

(30) Foreign Application Priority Data

Sep. 30, 2022     (JP) ................................. 2022-158000

(51) Int. Cl.
*G06F 15/173*          (2006.01)
*H04L 43/045*          (2022.01)
*H04L 43/0864*         (2022.01)

(52) U.S. Cl.
CPC ........ *H04L 43/0864* (2013.01); *H04L 43/045* (2013.01)

(58) Field of Classification Search
CPC ... H04L 43/0864; H04L 43/045; H04L 43/12; H04L 43/0882; H04L 43/0829; H04L 43/10
See application file for complete search history.

(56) References Cited

U.S. PATENT DOCUMENTS

| | | | | |
|---|---|---|---|---|
| 11,483,728 | B1 * | 10/2022 | Hageman | ................ H04L 43/08 |
| 12,010,007 | B1 * | 6/2024 | Wallace | ................. H04L 43/16 |
| 2011/0282642 | A1 * | 11/2011 | Kruger | ................. H04L 41/145 |
| | | | | 703/27 |
| 2011/0286348 | A1 * | 11/2011 | Yamasaki | ............... H04L 43/08 |
| | | | | 370/252 |
| 2016/0212032 | A1 | 7/2016 | Tsuruoka | |
| 2021/0367870 | A1 * | 11/2021 | Kim | .................... H04L 43/0864 |
| 2022/0070146 | A1 * | 3/2022 | Gerstel | ............... H04L 12/2854 |
| 2022/0271987 | A1 * | 8/2022 | McCallen | ............. H04W 24/06 |

FOREIGN PATENT DOCUMENTS

| | | |
|---|---|---|
| JP | 2000-216811 A | 8/2000 |
| JP | 2008-199426 A | 8/2008 |
| JP | 2016-134712 A | 7/2016 |
| JP | 6004116 B2 | 10/2016 |
| WO | 2020/012973 A1 | 1/2020 |

* cited by examiner

*Primary Examiner* — Padma Mundur
(74) *Attorney, Agent, or Firm* — Sughrue Mion, PLLC

(57)          ABSTRACT

A measuring apparatus including: a transmission part transmitting a probe packet wherein a communication apparatus to be measured is arranged in a communication path destined for a destination-communication apparatus, a reception part receiving a response packet from destination-communication apparatus in response to the probe packet, a time-measuring part measuring time, an analyzing part analyzing the response packet, an output part outputting an analysis result, the analyzing part calculating analysis result based on measuring result of the time-measuring part.

18 Claims, 9 Drawing Sheets

SOURCE-
COMMUNICATION
APPARATUS 12.345 ms

COMMUNICATION
APPARATUS TO BE
MEASURED 45.678 ms

DESTINATION-
COMMUNICATION
APPARATUS

SOURCE-
COMMUNICATION
APPARATUS

256Mbps 123.56 km

COMMUNICATION
APPARATUS TO BE
MEASURED

128Mbps 456.78 km

DESTINATION-
COMMUNICATION
APPARATUS

START

SEND PROBE PACKET AND MEASURE TIME — S0301

RECEIVE RESPONSE PACKET AND MEASURE TIME — S0302

ANALYZE RESPONSE PACKET BASED ON MEASURED TIME — S0303

OUTPUT ANALYSIS RESULT — S0304

END

FIG. 5

RTT[ms]

| RTT SEGMENT | VALUE OF SEGMENT | NUMBER OF OBSERVATIONS PER RTT SEGMENT |
|---|---|---|
| 107 | 107.0~107.9 | 1 |
| 106 | 106.0~106.9 | 35 |
| 105 | 105.0~105.9 | 16 |
| 104 | 104.0~104.9 | 11 |
| 103 | 103.0~103.9 | 16 |
| 102 | 102.0~102.9 | 0 |
| 101 | 101.0~101.9 | 0 |
| 100 | 100.0~100.9 | 0 |

| TIME SEGMENT | 0 | 10 | 20 | 30 | 40 | 50 | 60 | 70 | 280 |
|---|---|---|---|---|---|---|---|---|---|
| VALUE OF TIME SEGMENT | 0~9 | 10~19 | 20~29 | 30~39 | 40~49 | 50~59 | 60~69 | 70~79 | |

ELAPSED TIME FROM START OF PROBE PACKET TRANSMISSION [ms]

START

S0701 — START SENDING PROBE PACKET AND MEASURE START TIME

S0702 — RECEIVE RESPONSE PACKET AND MEASURE TIME OF FIRST RECEPTION

S0703 — DETECT PACKET LOSS AND MEASURE TIME OF FIRST DETECTION

S0704 — STOP SENDING PROBE PACKET AND MEASURE STOP TIME

S0705 — MEASURE TIME OF LAST RESPONSE PACKET ARRIVAL

S0706 — CALCULATE RTT

S0707 — OUTPUT RTT VALUE

END

FIG. 8

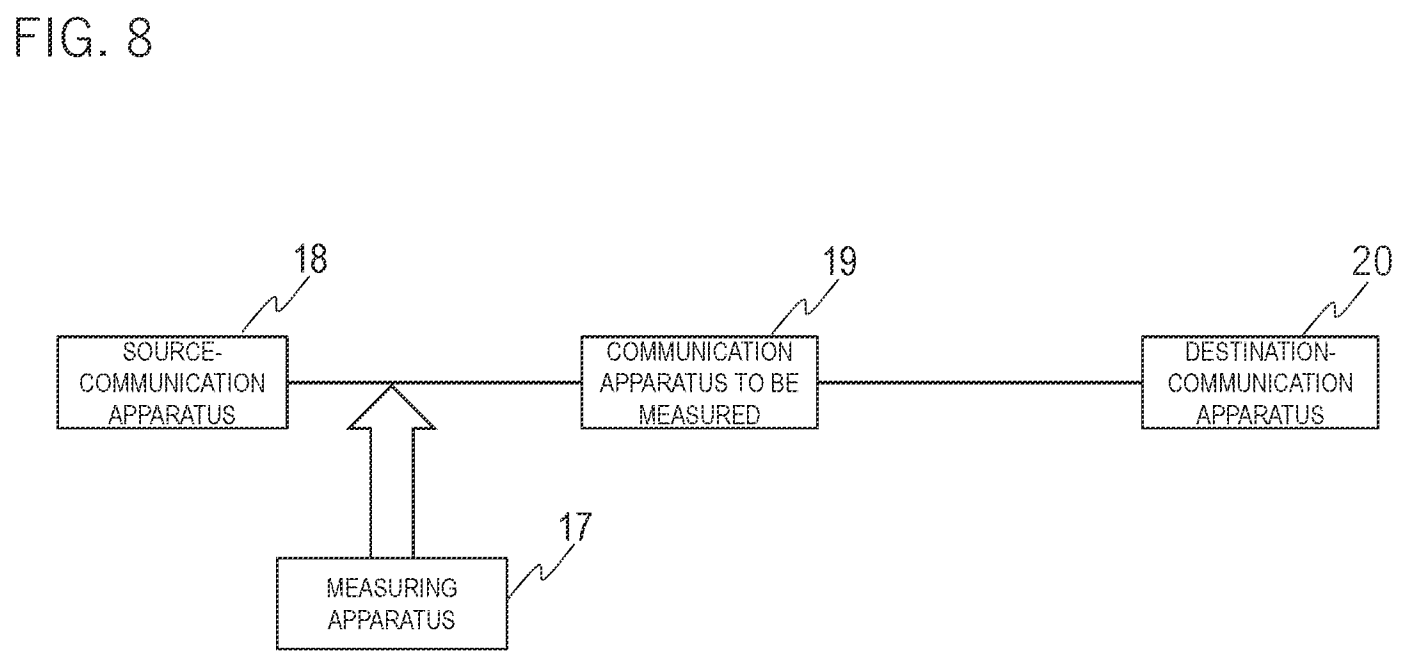

SOURCE-COMMUNICATION APPARATUS 18

COMMUNICATION APPARATUS TO BE MEASURED 19

MEASURING APPARATUS 17

DESTINATION-COMMUNICATION APPARATUS 20

APPARATUS, METHOD, AND RECORDING MEDIUM FOR MEASURING TIME OF TRANSMISSION BY TRANSMITTING AND RECEIVING PACKETS

FIELD

Reference to Related Application

The present invention is based upon and claims the benefit of the priority of Japanese patent application No. 2022-158000, filed on Sep. 30, 2022, the disclosure of which is incorporated herein in its entirety by reference thereto.

The present invention relates to a measuring apparatus, a method for measuring, and recorded program medium.

BACKGROUND

In order to expand the functionality and scale of an ICT (Information and Communication Technology) system, it may become necessary to improve network performance of an entire ICT system. Improving functionality of all apparatuses will certainly produce good results, but since installation and operation costs are limited, system should be designed to achieve a maximum effect at a minimum cost.

In addition, although ICT systems are estimated in a scale assumed at time of design, there may be differences from initial estimates during actual operation. For example, it is necessary to evaluate performance of the actual system in operation to understand where network bottlenecks are, in accordance with actual conditions.

There is no guarantee that all communication apparatuses are under their own control, especially in ICT systems via the Internet. In addition, inexpensive network apparatus may not have an ability to determine its status, or may not be accurate. Therefore, it is difficult to obtain accurate performance of entire network of the ICT system.

PTL 1 discloses the following communication control apparatus and the like. The apparatus, etc. is placed between a transmitting apparatus and a receiving apparatus, and performs control to improve throughput of communication. For example, it estimates a target transmission speed between the transmitting apparatus and the communication control apparatus, etc., and between the communication control apparatus, etc., and the receiving apparatus, etc., and controls by adjusting timing of packet transmission or adjusting order of packet transmission based on the target communication speed.

Concretely, available bandwidth is defined as, for example, size of a data packet divided by interval between data packet reception, multiplying the available bandwidth by RTT (Round Trip Time) is estimated as the target transmission speed, available bandwidth is also defined as amount of data confirmed to have arrived by ACK packets divided by interval between ACK packets received, multiplying the available bandwidth by RTT is estimated as target transmission speed, and so on.

[Patent Literature 1] International Publication WO 2020/012973 A1

SUMMARY

The disclosure of the above PTL 1 is incorporated herein by reference thereto. The following analysis has been made by present inventors.

It is possible to estimate a communication speed of a particular network segment in order to perform a control for throughput improvement by using technology described in PTL 1. However, this technology does not reach estimating processing capacity of devices located within the particular network segment due to the problem of this technology, and it is not a sufficient solution with respect to a task to evaluate accurate performance of the entire network by evaluating performance of each network device.

It is a purpose of present invention to provide a measuring apparatus, a method of measuring, and a program capable of evaluating performance of a network equipment located within a particular network segment.

According to a first aspect of the present invention, there is provided a measuring apparatus comprising: at least a processor; and a memory in circuit communication with the processor, wherein the processor is configured to execute program instructions stored in the memory to implement: a transmission part that transmits a probe packet to a destination-communication apparatus, wherein a communication apparatus to be measured is arranged in a communication path destined for the destination-communication apparatus, a reception part that receives a response packet from the destination-communication apparatus in response to the probe packet, a time-measuring part that measures time, an analyzing part that analyzes response packet; and an output part that outputs a result of the analysis, wherein the analyzing part calculates the result of the analysis based on measured result of the time-measuring part.

According to a second aspect of the present invention, there is provided: a measuring apparatus comprising: at least a processor; and a memory in circuit communication with the processor, wherein the processor is configured to execute program instructions stored in the memory to implement: a capturing part that captures packets to a destination-communication apparatus and response packets from the destination-communication apparatus in response to the packets, wherein the communication apparatus to be measured is arranged in a communication path destined for the destination-communication apparatus, a time-measuring part that measures time, an analyzing part that analyzes a response packet; and an output part that outputs a result of the analysis, wherein the analyzing part calculates the result of an analysis based on a measured result of the time-measuring part.

According to a third aspect of the present invention, there is provided: a method for measuring, comprising: transmitting a probe packet to a destination-communication apparatus, wherein a communication apparatus to be measured is arranged in a communication path destined for the destination-communication apparatus, receiving a response packet from the destination-communication apparatus in response to the probe packet, measuring time, analyzing the response packet; and outputting a result of the analysis, wherein the analyzing calculates the result of the analysis based on a measured result of the measuring time.

According to a fourth aspect of the present invention, there is provided: a non-transitory computer-readable recording medium storing thereon a program configured to cause a computer to execute: a process of transmitting a probe packet to a destination-communication apparatus, wherein a communication apparatus to be measured is arranged in a communication path destined for the destination-communication apparatus; a process of receiving a response packet from the destination-communication apparatus in response to the probe packet; a process of measuring time; a process of analyzing the response packet; and a process of outputting a result of the analysis, wherein the process of analyzing calculates the result of the analysis based on a measured result of the process of measuring time.

According to the present invention and disclosure, it is possible to provide a measuring apparatus, a measuring method, and a program capable of evaluating performance of a network equipment located within a particular network segment.

BRIEF DESCRIPTION OF DRAWINGS

FIG. 5 is a diagram of an example of time-by-time distribution of RTTs.

FIG. 8 is a schematic diagram illustrating an outline of operations of measuring apparatus of a third example embodiment of the disclosure.

EXAMPLE EMBODIMENTS

Figure 1:
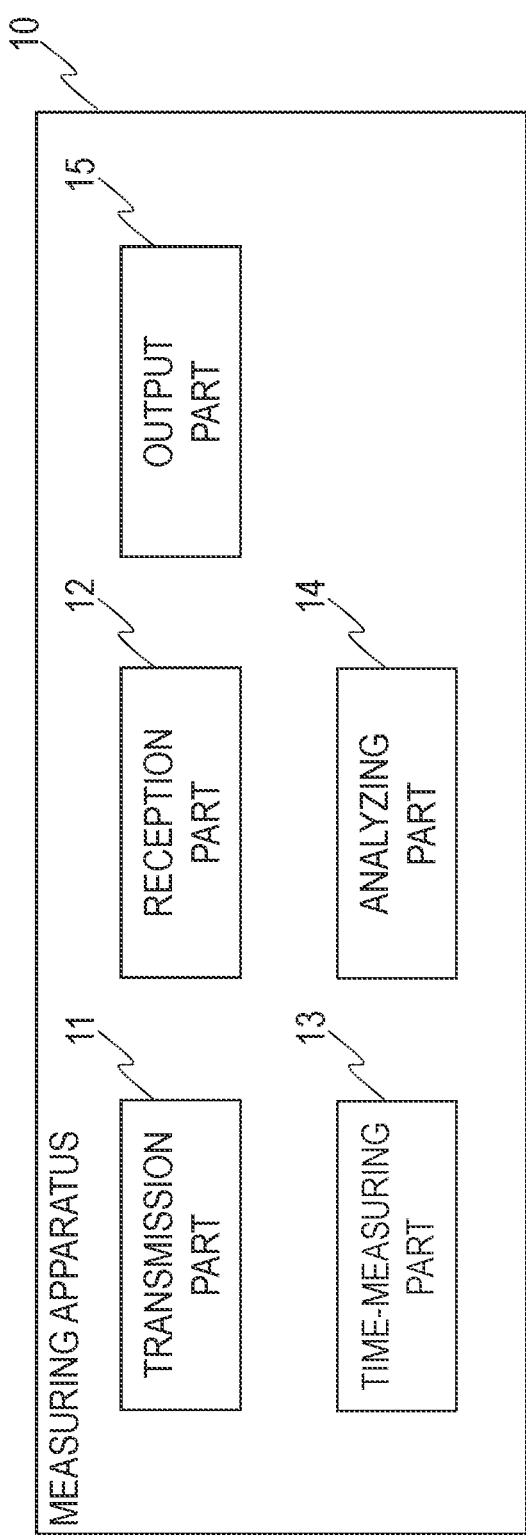
FIG. 1 is a block diagram illustrating a configuration of an example embodiment of a measuring apparatus.

First, an outline of an example embodiment of the present disclosure will be described with reference to drawings. Namely, drawing reference codes attached to this outline are for the sake of convenience and as an example to aid in understanding, and are not intended to limit the present disclosure to the manner illustrated in the drawings. The connecting lines between blocks in the drawings and other documents referred to in the following description include both bi-directional and uni-directional lines. As for the unidirectional arrow, it is intended to schematically show a flow of a main signal (data), and does not exclude bidirectionality. Furthermore, in circuit diagram, block diagram, internal configuration diagram, and connection diagram shown in the present application disclosure, input ports and output ports are present at input and output ends of each connection line, respectively, although they are not explicitly indicated. The same applies to input/output interfaces.

FIG. 1 is a block diagram illustrating a configuration of an example embodiment of a measuring apparatus. As shown in the figure, a measuring apparatus 10 in the example embodiment comprises a transmission part 11, a reception part 12, a time-measuring part 13, an analyzing part 14, and an output part 15.

The transmission part 11 transmits a probe packet to a destination-communication apparatus, wherein a communication apparatus to be measured is arranged in a communication path destined for the destination-communication apparatus. The reception part 12 receives a response packet from the destination-communication apparatus in response to the probe packet. The time-measuring part 13 measures time. The analyzing part 14 analyzes the response packet(s). The output part 15 outputs a result of the analysis.

The analyzing part 14 further calculates the result of the analysis based on a measured result of the time-measuring part.

The measuring apparatus 10 in an example embodiment receives a response packet of a probe packet sent from the transmission part 11 to a destination-communication apparatus at the reception part 12, and measures time at the time-measuring part 13. Based on the measured time, analysis can be performed to analyze communication capacity in communication paths and performance of communication devices to be measured that are arranged in communication paths.

The concrete example embodiments are described in more detail below with reference to drawings. Note that in each example embodiment, the same symbol is attached to the same component and its description is omitted.

First Example Embodiment

As shown in FIG. 1, a measuring apparatus 10 in this example embodiment comprises a transmission part 11, a reception part 12, a time-measuring part 13, an analyzing part 14, and an output part 15, as in an example embodiment described above.

The transmission part 11 transmits a probe packet to a destination-communication apparatus, wherein a communication apparatus to be measured is arranged in a communication path destined for the destination-communication apparatus. As described above, "communication apparatus to be measured" (termed as a "target apparatus for measurement") is arranged in a communication path(s) on a network that is between measuring apparatus that sends probe packets and a destination-communication apparatus. "Probe Packet" is a packet sent to destination-communication apparatus through the communication apparatus to be measured for measurement. When a probe packet arrives at the destination-communication apparatus, the destination-communication apparatus sends a response packet as described below, which is received by the measuring apparatus. At this time, an identifier is attached to the probe packet so that the response packet from the destination can identify which probe packet it is in response to. An example of a probe packet is a ping command, and a response packet is an echo packet of ICMP sent from the destination-communication apparatus.

Total number of probe packets and their capacity per packet should be adjustable. For example, the measuring apparatus 10 may further include an input part (not shown) that receives total number of probe packets, and capacity per packet.

The reception part 12 receives a response packet from the destination-communication apparatus in response to the probe packet. Since response packets are described above, explanation is omitted.

The time-measuring part 13 measures time. The time-measuring part 13 provides current time in response to a request from each part. For example, RTT can be calculated by obtaining ts, time of probe packet transmission by transmission part 11, and tr, time of reception of response packet by reception part 12, and computing tr−ts in analyzing part 14, described below.

The analyzing part 14 analyzes the response packet(s). "Analysis" refers to obtaining some analysis result from information contained in the response packet. For example, the above analysis results are calculated based on measurement result(s) of the time-measuring part 13. For example, the above RTT is calculated, or further analysis results (described below) are obtained based on the calculated RTT.

Output part 15 outputs the results of the analysis performed by the analyzing part 14. Concretely, as a result of the analysis, the numerical values, etc. thereof are output through an input/output interface such as a display. The output part 15 may present a result of the analysis by the analyzing part by way of numerical values schematically illustrating arrangement(s) of measuring apparatus, communication apparatus to be measured, and destination-communication apparatus (FIG. 2A).

Figures 2A, 2B:
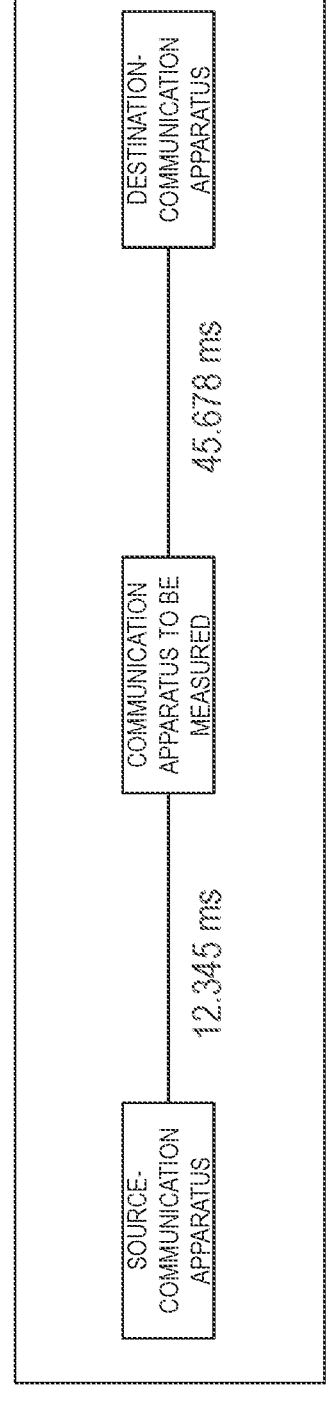
FIGS. 2A and 2B are a diagram illustrating outline of output of analyzing results by output part of the measuring apparatus in a first example embodiment of the disclosure, respectively.

Further, it may determine intervals between the measuring apparatus, the communication apparatus to be measured, and the destination-communication apparatus, schematically according to a distance(s) between them and RTT, and determine thickness and color (not shown) of a line segment (s) connecting apparatuses each other according to communication bandwidth (medium speed) between them (FIG. 2B).

[Description of Operations]

Figure 3:
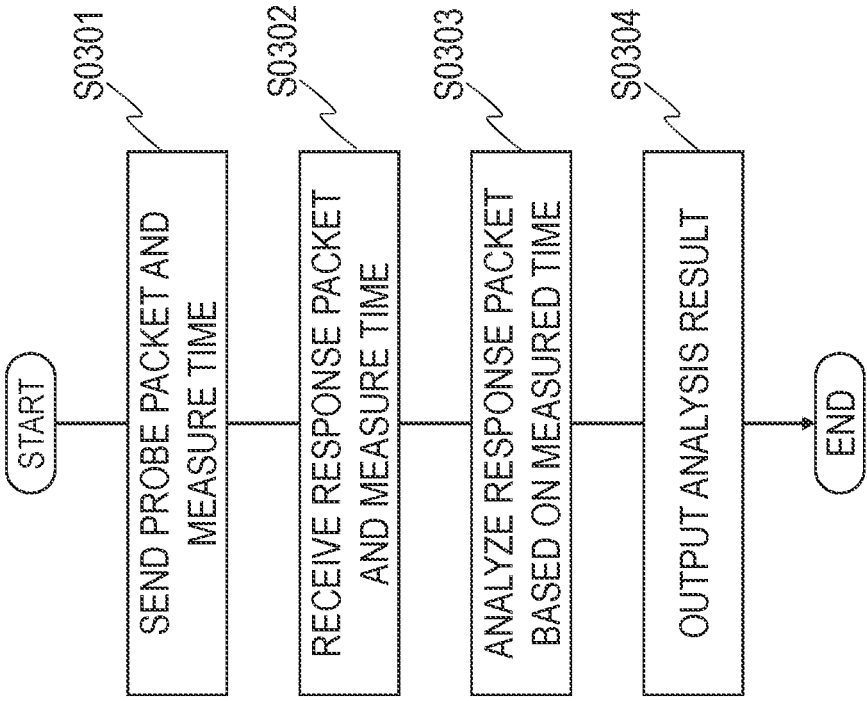
FIG. 3 is a flowchart illustrating an example of operation of the measurement apparatus of the first example embodiment of the disclosure.

FIG. 3 is a flowchart illustrating an example of operation of the measurement apparatus of the first example embodiment of the disclosure. As shown in this figure, the measuring apparatus 10 first transmits a probe packet to a destination-communication apparatus, wherein a communication apparatus to be measured is arranged in a communication path destined for the destination-communication apparatus by a computer, and also measures time of the transmission (step S0301). Next, response packets from the destination-communication apparatus in response to the probe packet are received and time is measured (Step S0302). Next, the response packet(s) is analyzed based on the measured time (step S0303). Finally, analysis result is output (step S0304) and a process is terminated.

[Detailed Description of Operations]

Figure 4:
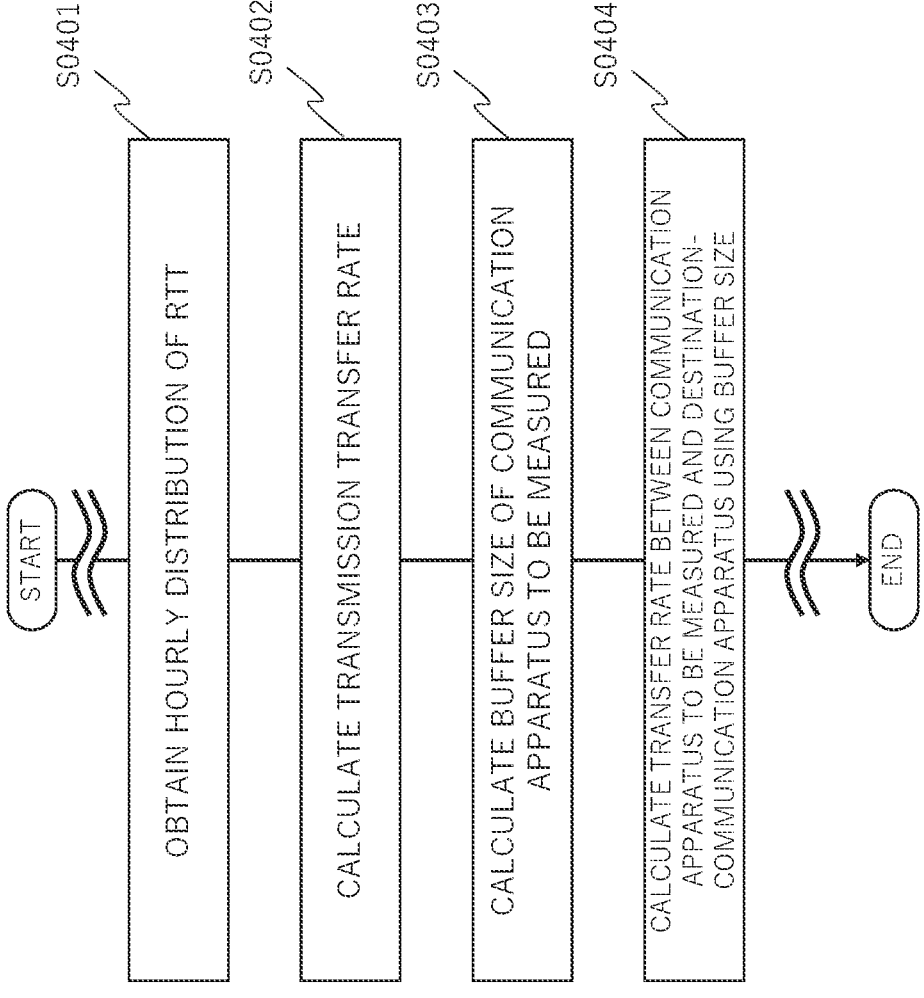
FIG. 4 is a flowchart illustrating an example of details of operation of the measuring apparatus of the first example embodiment of the disclosure.

FIG. 4 is a flowchart to explain in detail an example of operations of an analysis process of the measurement apparatus 10 of the example embodiment. As shown in this figure, first, distribution of RTT per hour is obtained (step S0401). FIG. 5 shows an example of hourly distribution of RTT. Vertical axis is RTT, and horizontal axis is elapsed time since start of probe packet transmission. Each axis has classes, and numerical values and representative values (RTT and time intervals) for each class interval are shown. Bold line in graph is a straight line that approximates the distribution. Referring to this figure, the minimum RTT interval $RTT_{min}$ (103 in the figure) and the maximum RTT-max (106 in the figure) are obtained. As for obtaining $RTT_{min}$, at the beginning of transmission of probe packets, transmission is performed at a transmission rate sufficiently lower than a transmission rate between communication apparatus to be measured and destination-communication apparatus (flat straight line part up to a time segment 10 in graph shown in FIG. 5), and value of $RTT_{min}$ is obtained. After that, a transmission rate of probe packets is made larger than a transmission rate between communication apparatus to be measured and destination-communication apparatus, i.e., a bottleneck is caused (to occur) and a process (processes) to obtain value of RTTmax (straight line in graph in FIG. 5 rises diagonally, and then becomes flat). Then, $T_{rtmin}$, a time segment where $RTT_{min}$ was last observed (10 ms in the figure) and $T_{rttmax}$, a time segment in which $R_{TTmax}$ was first observed (40 ms in the figure) are obtained, and the difference $T_{range}$ between the two is calculated. $T_{range}$ is a time length from start of data accumulation in buffer until it overflows, and is a segment of straight line in FIG. 5 that rises diagonally.

Assume that already accepted and given are a capacity of one survey packet |P|[bytes] (1500 [bytes] as an example) and number S of packets sent during $T_{range}$ (30 [bytes] as an example). These may be received before the measuring operation.

Here, a transmission transfer rate for a segment from the measuring apparatus 10 to the communication apparatus to be measured is obtained by S÷$T_{range}$×|P|(30 [pieces]=0.030 [s]×1,500 [bytes]=1,500,000 [bytes/s]) (step S0402).

Next, a buffer size of communication apparatus to be measured is determined (step S0403). The buffer size is obtained by determining a difference of minimum in-flight capacity from maximum in-flight capacity of a network. Here, "in-flight capacity" refers to a capacity of data before guaranteed arrival by ACK (ACKnowledgement) that exists in a communication channel or in a buffer of communication apparatus, etc. in communication. Using values in FIG. 5, the minimum in-flight capacity is calculated by multiplying transmission transfer rate between the measuring apparatus 10 and the communication apparatus to be measured by RTTmin (as an example, 1,500,000×0.103=154,500 [bytes]). Maximum in-flight capacity is calculated by multiplying transmission transfer rate between the communication apparatus to be measured and the measuring apparatus 10 by RTTmax (for example, 1,500,000×0.106=159,000 [bytes]). Buffer size of the communication apparatus to be measured is calculated by taking difference between these two values. As an example, 159,000−154,500=4,500 [bytes].

Finally, the transmission rate between the communication apparatus to be measured and the destination-communication apparatus is calculated using the buffer size (Step S0404). Calculation is obtained by (Transmission transfer rate×Trange−Buffer size)/Trange. (As an example, (1,500,000×0.03−4,500)÷0.03=1,350,000 [bytes/s]).

Note that calculation of the transfer rate between the communication apparatus to be measured and the destination-communication apparatus (step S0404) is not mandatory and may be executed as needed.

[Hardware Configuration]

Figure 6:
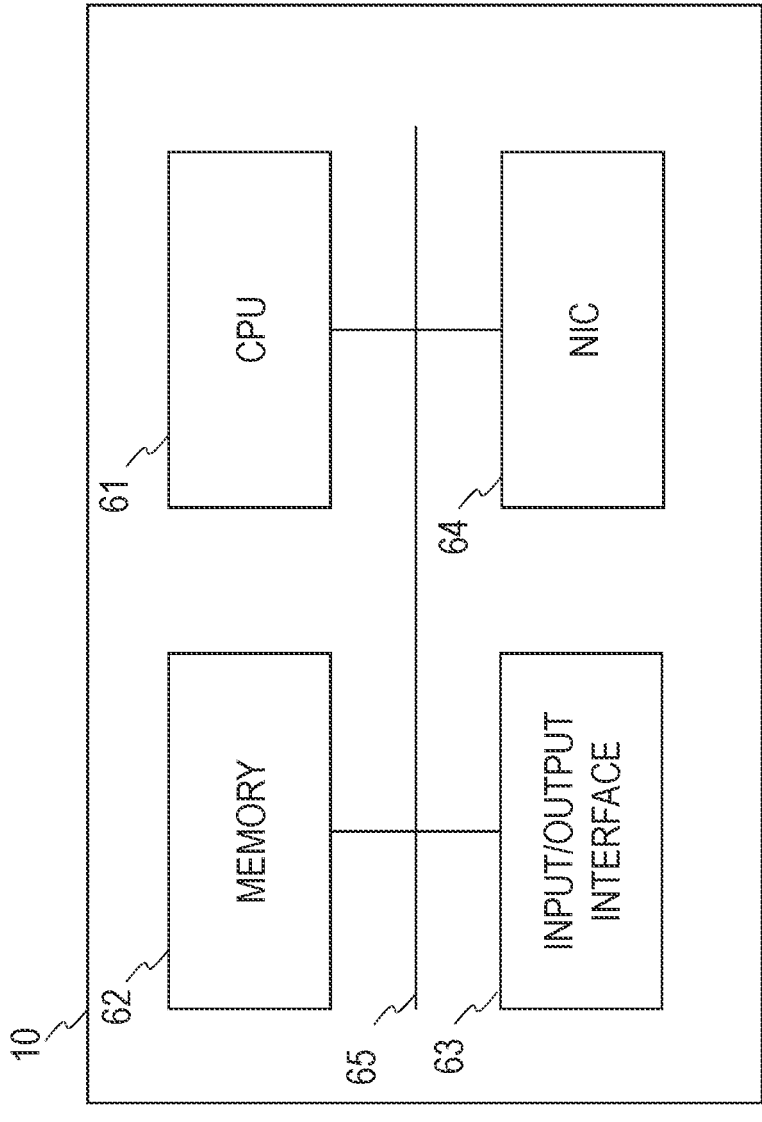
FIG. 6 is a diagram illustrating an example of hardware configuration of the measuring apparatus of the first example embodiment of disclosure.

The measuring apparatus 10 in the example embodiment can be configured by information processing apparatus (computer), and has a configuration as illustrated in FIG. 6. For example, measuring apparatus has a CPU (Central Processing Unit) 61, memory 62, input/output interface 63, and NIC (Network Interface Card) 64 as communication means, which are interconnected by an internal bus 65.

However, the configuration shown in FIG. 6 is not intended to limit the hardware configuration of the measuring apparatus 10. Measuring apparatus 10 may include hardware not shown in FIG. 6, and may not have an input/output interface 63 if necessary. Number of CPUs, etc. included in the measuring apparatus 10 is also not intended to be limited to an example shown in FIG. 6; for example, multiple CPUs may be included in the measuring apparatus 10.

Memory 62 is RAM (Random Access Memory), ROM (Read Only Memory), or auxiliary storage device (such as a hard disk).

Input/output interface 63 is a means of interface for display and input apparatuses, which are not shown in the figure. Display apparatus is, for example, a liquid crystal display or the like. Input device is apparatus that receives user operations, such as a touch panel, keyboard, or mouse, for example.

Function of measuring apparatus 10 is realized by a group of programs (processing modules) such as transmission program, reception program, time-measuring program, analysis program, output program, input program, etc. stored in memory 62, and a group of data such as analysis results, etc. held in storage area. These processing modules are realized, for example, by CPU 61 executing each of programs stored in the memory 62. The programs can be downloaded via a network or updated using a storage medium storing the programs. Furthermore, the above processing module may be realized by a semiconductor chip. That is, there should be some hardware and/or software means to execute functions performed by the above processing module.

[Hardware Operations]

After the measuring apparatus 10 starts operation, a transmission program is called from memory 62, and CPU 61 puts it in state of execution. Note that the input program may be executed by CPU 61 before that, and total number of probe packets and capacity per probe packet may be received by input/output interface 63. The received total number and capacity are stored in memory 62. Based on these total numbers and capacities, a transmission program transmits probe packets via NIC 64.

Here, the time-measuring program receives a trigger from the transmission program and measures time. Measured probe packet transmission time is stored in memory 62. Also, a probe packet transmission start time, which is the time measured at the start of probe packet transmission, is stored in memory 62.

Next, a reception program is called from memory 62 and is executed by CPU 61. The program waits for a response packet from the destination-communication apparatus and receives it via NIC 64.

Here, time-measuring program receives a trigger from reception program and measures time. Measured response packet reception time is stored in memory 62.

Time-measuring program calculates the packet response time based on a probe packet transmission time and a response packet reception time, and stores it in memory 62. Note that the calculation process may be performed by analysis program, which is described later. The calculated packet response time may be used as a RTT value. At this time, time-measuring program receives a trigger from the reception program and measures time. From the measured time and the probe packet transmission start time stored in memory 62, an elapsed time from start of the probe packet transmission is calculated and stored in memory 62.

The above transmission program, reception program, and time-measuring program operations are repeated for number of probe packets (≥number of response packets).

Next, an analysis program is called from memory 62 and is put it into execution by CPU 61. The program reads a packet response time for each packet stored in memory 62. It also reads a probe packet transmission start time stored in memory 62.

Analysis program reads a packet response time of each response packet stored in memory 62 and elapsed time from start of the transmission of probe packets. Analysis program also reads total number of probe packets stored in memory 62 at the time of transmission and value of capacity per probe packet. Analysis program calculates buffer size of the communication apparatus to be measured and line bandwidth (between the measuring apparatus and the communication apparatus to be measured, and between the communication apparatus to be measured and the destination-communication apparatus) according to procedures described in [Detailed Description of Operation] above.

With the measuring apparatus 10 of the first example embodiment described above, it is possible to calculate line bandwidth and buffer size of the communication apparatus to be measured based on RTT (Round Trip Time) based on the packet response time and the elapsed time from start of transmission of probe packets.

Second Example Embodiment

In a second example embodiment, a measuring apparatus capable of generating packet loss in communication by saturating its buffer of the communication apparatus to be measured, and detecting it, and calculating RTT between respective apparatuses based on quantity of packet loss detected and time of detection of packet loss will be described.

[Configuration]

Measuring apparatus 10 according to the second example embodiment has the same configuration as the first example embodiment. Difference between the first example embodiment and the second example embodiment resides in that the reception part 12 further detects packet loss, time-measuring part 13 obtains detection time of packet loss at reception part 12, and analyzing part 14 further calculates RTT to communication apparatus to be measured based on quantity of packet loss and detection time of the packet loss, and calculates RTT from the communication apparatus to be measured to destination-communication apparatus.

[Description of Operation].

Figure 7:
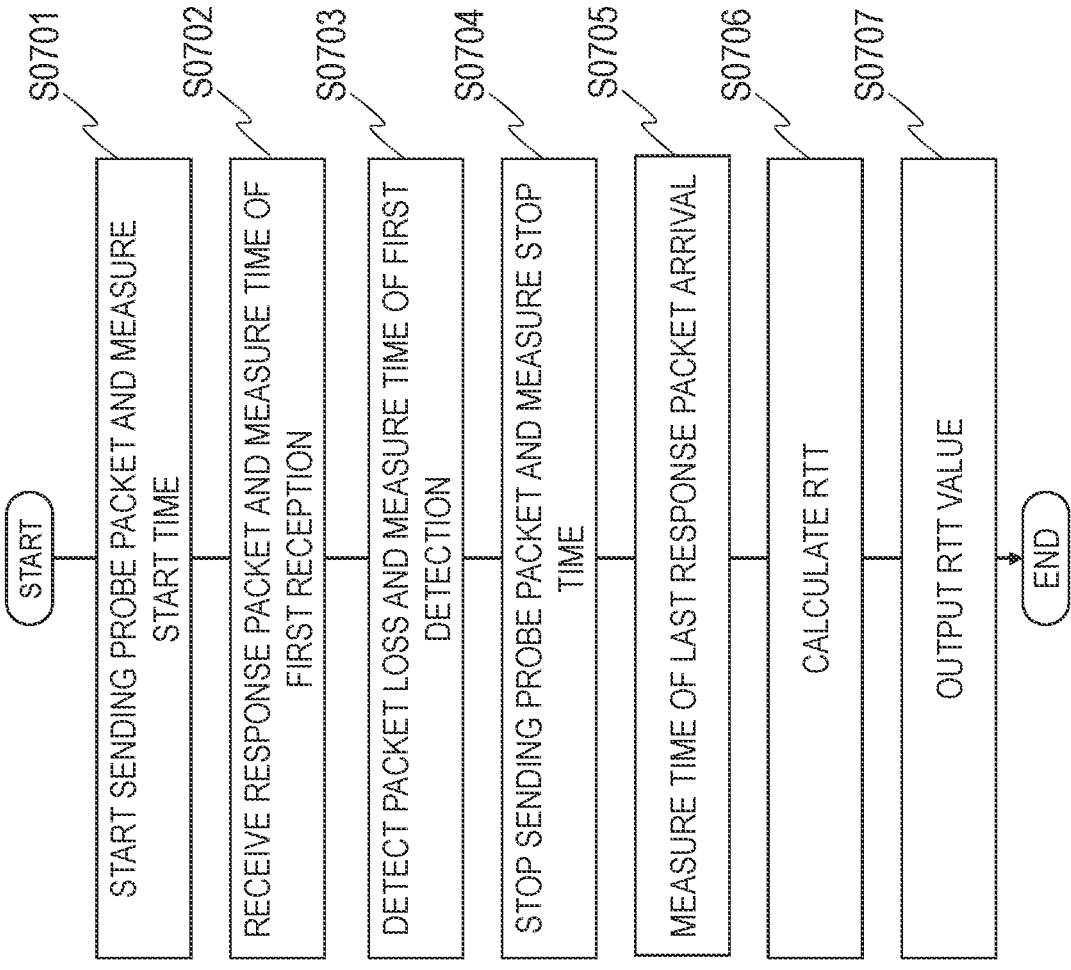
FIG. 7 is a flowchart illustrating an example of operation of the measurement apparatus of a second example embodiment of the disclosure.

FIG. 7 is a flowchart illustrating an example of operation flow of an example embodiment of the measuring apparatus. First, transmission of probe packets is started, and the start time t0 of transmission is measured (step S0701). Next, a response packet is received, and time t1 is measured at which the first time response packet is received (step S0702). Next, packet loss is detected and time t2 is measured at which RTTmax is observed for the first time (step S0703). Next, transmission of probe packets is terminated, and the stop time t3 is measured (step S0704). Then, time t4 at which the last response packet arrived is measured (step S0705). RTT is then calculated based on the above times measured (step S0706).

Concretely, first, number of lost packets per unit time (loss rate) between t2 and t3 is calculated based on detection time of packet loss and set as loss a rate A. Also, tc is defined as a time between t2 and t4 when a loss rate begins to be smaller than the loss rate A. Next, RTT value (2tx) between the measuring apparatus and the communication apparatus to be measured is calculated by the following formula.

$$tc = t3 + 2tx \rightarrow 2tx = tc - t3 \qquad \text{[Formula 01]}$$

Note that the reason RTT value is set to 2tx in the above formula is that the outbound and inbound routes of the packet are taken into account . . . .

RTT value (2ty) between the communication apparatus to be measured and the destination-communication apparatus is also calculated from the following formula.

$$ty = (t1 - t0 - 2tx)/2 \qquad \text{[Formula 02]}$$

Finally, calculated tx and ty are output (step S0707), and operation is terminated.

Note that based on calculated tx and ty, it is possible to calculate each distance by multiplying tx and ty by media speed(s) calculated in the above example embodiments, respectively.

Measuring apparatus of the example embodiment can be combined with the measuring apparatus of the first example embodiment. By combining them, it is possible to determine performance(s) of line and apparatus more accurately.

The measuring apparatus according to the present example embodiment makes it possible to calculate RTT between the measuring apparatus and communication apparatus to be measured, and between the communication apparatus to be measured and the destination-communication apparatus, thus enabling a more accurate understanding of line performance.

Third Example Embodiment

In the above example embodiment, it is possible to calculate line bandwidth, buffer size, etc. by sending probe packets, receiving response packets, and performing analysis. In other words, it is possible to calculate performance of line and communication apparatus to be measured based on communications under own control by itself (measuring apparatus). In the present example embodiment, a measuring apparatus 17 determines performance of a line or a communication apparatus to be measured based on communications that are not under the control of measuring apparatus. This is based on a presumption that events such as temporary saturation of the line bandwidth or buffer of a communication apparatus occur regularly in the network, and if it is possible to record communication data over a relatively long period of time without omission, the recorded communication data can be used to determine performance of line bandwidth and performance of communication apparatuses.

FIG. 8 is a schematic diagram to show an outline of operations of measuring apparatus 17 of the example embodiment. As shown in this figure, measuring apparatus 17 of the example embodiment performs measurements by capturing packets addressed to destination-communication apparatus 20 or to source-communication apparatus 18 that flow on lines between the source-communication apparatus 18 and the communication apparatus to be measured 19.

[Configuration]

Figure 9:
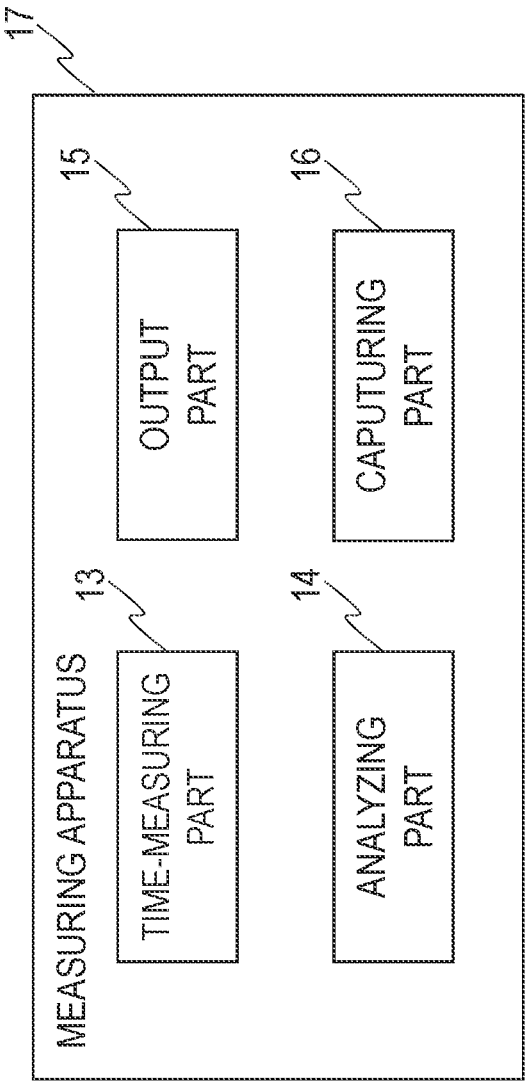
FIG. 9 is a block diagram illustrating a configuration of a measuring apparatus in a third example embodiment of the disclosure.

FIG. 9 is a block diagram illustrating an example of the configuration of measuring apparatus 17 in the example embodiment. As shown in this figure, measuring apparatus 17 has a capturing part 16, a time-measuring part 13, an analyzing part 14, and an output part 15. Difference from the above example embodiment is that it has a capturing part 16 instead of a transmission part 11 and a reception part 12. Note that the time-measuring part 13, analyzing part 14, and output part 15 have already been described in the above example, so descriptions of them are omitted.

A capturing part 16 captures packets wherein a communication apparatus to be measured is arranged in the communication path destined for the destination communication apparatus, and response packets from the destination communication apparatus in response to the packets. This function is equivalent to the so-called packet capture of conventional technology. Referring to the packet header information, packets from the source-communication apparatus 18 to the destination-communication apparatus 20 via the destination-communication apparatus 19 to be measured, and response packets according to the same packets from the destination-communication apparatus 20 to the source-communication apparatus 18 via the communication apparatus to be measured are captured. The captured packets are stored in storage in the measuring apparatus 17.

Note that time of packet transmission and time of reception of response packets may be obtained and analyzed by the capturing part 16, since transmission of the packets is not under control of the measuring apparatus 17.

Since the measuring apparatus 17 in this example embodiment does not send or receive packets under its own control, it is impossible to spontaneously obtain, for example, t3 ("time of which transmission of probe packets stopped") obtained in the second example embodiment. However, there is a sufficient possibility that buffer overflow at a target apparatus for analysis will result in packet loss and then the source-communication apparatus 18 will stop transmitting packets. In other words, unlike the above example embodiment, the measuring apparatus 17 in this example embodiment differs from the above example embodiment in that the capturing part 16 captures packets for a sufficiently long time and accumulates them, enabling the analyzing part 14 to extract the above event and obtain numerical values for each indicator (e.g., t0 to t4) used for analysis, and thus, it is expected to obtain the same analysis results as in the above example embodiment.

According to this example embodiment, measuring apparatus can estimate and determine performance(s) of lines and communication apparatuses to be measured, even for communications that are not under its own (measuring apparatus) control.

Some or all of the above example embodiments may also be described as in each of following notes. However, each of the following notes is merely an example of the disclosure, and the disclosure is not limited to such cases only.

[Note 1]

(See the measuring apparatus according to the first aspect above)

[Note 2]

The measuring apparatus according to note 1, wherein
the time-measuring part obtains a packet response time, which is a response time of response packets in response to the probe packet, and elapsed time from start of a transmission of the probe packet,
the analyzing part further calculates bandwidth and buffer size of the communication apparatus to be measured based on a RTT (Round Trip Time) based on the packet response time and based on the elapsed time.

[Note 3]

The measuring apparatus according to note 1, wherein
the reception part detects packet loss,
the time-measuring part obtains a time of detection of the packet loss at the reception part; and
the analyzing part further calculates a RTT until the communication apparatus to be measured and a RTT from the communication apparatus to be measured to the destination-communication apparatus based on quantity of packet loss and the detection time of the packet loss.

[Note 4]

The measuring apparatus according to note 3, wherein
the analyzing part further calculates a distance to the communication apparatus to be measured based on medium speed to the communication apparatus to be measured and a medium speed from the communication apparatus to be measured to the destination-communication apparatus.

[Note 5]

The measurement apparatus according to any one of notes 1 to 4, further comprising:

an input part that receives a total number of probe packets and a capacity per probe packet.

[Note 6]

The measuring apparatus according to any one of notes 1 to 4, wherein the output part graphically illustrates arrangements of the measuring apparatus, the communication apparatus to be measured, and the destination-communication apparatus, and displays numerically a result of the analysis by the analyzing part.

[Note 7]

The measuring apparatus according to note 6, wherein the output part further determines schematized spacings between the measuring apparatus, the communication apparatus to be measured, and the destination-communication apparatus, according to a distance of each apparatus and RTT, and determines thickness and color of a line segment connecting each of the apparatuses according to a line speed between the apparatuses.

[Note 8]

(See the measuring apparatus according to the second aspect above)

[Note 9]

(See the measuring method according to the third aspect above)

[Note 10]

(See the non-transitory computer-readable recording medium storing thereon a program according to the fourth aspect above) The above notes 8, 9 and 10 may be expanded as the above notes 2 to 7 likewise the note 1.

The disclosure of the above PTL etc. is incorporated herein by reference thereto, can be used as the basis or part of the disclosure if necessary. Variations and adjustments of the exemplary embodiment and examples are possible within the scope of the disclosure (including the claims) of the present disclosure and based on the basic technical concept of the present disclosure. Various combinations and selections (including partial deletion) of various disclosed elements (including the elements in the claims, exemplary embodiment, examples, drawings, etc.) are possible within the scope of the disclosure of the present disclosure. Namely, the present disclosure of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been Concretely disclosed. In the present disclosure, when an algorithm, software, flowchart, or automated process step is presented, it is obvious that a computer is used, and it is also obvious that the computer is equipped with a processor and memory or storage device. Therefore, it is understood that these elements are naturally described in the present application even if they are not explicitly presented.

REFERENCE SIGNS LIST

100,100a-100d: information provision server, information provision system

10,17: measuring apparatus

11: transmission part

12: reception part

13: time-measuring part

14: analyzing part

15: output part

16: capturing part

18: source-communication apparatus

19: communication apparatus to be measured

20: destination-communication apparatus

61: CPU

62: memory

63: input/output interface

64: NIC

65: internal bus

What is claimed is:

1. A measuring apparatus, comprising:

at least a processor; and a memory in circuit communication with the processor, wherein the processor is configured to execute program instructions stored in the memory to implement:

a transmission part that transmits probe packets, to a destination-communication apparatus, through a communication path in which a communication apparatus to be measured is arranged, a reception part that receives response packets sent from the destination-communication apparatus when the probe packets arrive at through the communication apparatus to be measured, a time-measuring part that measures time of probe packet transmission and time of reception of the response packet, an analyzing part that calculates a packet response time by subtracting the time of reception of the response packet from the time of probe packet transmission; and an output part that outputs a result of the analysis calculated by the analyzing part, and wherein:

the time-measuring part obtains an elapsed time from start of a transmission of the probe packet, and the analyzing part further obtains a transmission transfer rate based on a RTT (Round Trip Time) based on the packet response time and based on the elapsed time, and calculates buffer size of the communication apparatus to be measured based on the transmission transfer rate, wherein the transmission transfer rate is calculated based on the RTT by obtaining distribution of the RTT per hour;

obtaining the minimum RTT interval (RTTmin) and the maximum RTT interval RTTmax);

obtaining Trttmin which is a time segment where RTTmin was last observed and Trttmax which is a time segment in which RTTmax was first observed, and calculating the difference Trange between the two;

given are a capacity of one survey packet |P| [bytes] and number S of packets sent during $T_{range}$ obtaining a transmission transfer rate [bytes/s] by calculating $S \div Trange \times |P|$, and a buffer size of the communication apparatus to be measured is calculated by taking difference between a value obtained by multiplying the transmission transfer rate and the minimum RTT interval RTTmin and a value obtained by multiplying the transmission transfer rate and the maximum RTT interval.

2. The measuring apparatus according to claim 1, wherein:

the reception part detects packet loss, the time-measuring part obtains a time of detection of the packet loss at the reception part; and the analyzing part further calculates a RTT until the communication apparatus to be measured and a RTT from the communication apparatus to be measured to the destination-communication apparatus based on a loss rate calculated from quantity of packet loss and the detection time of the packet loss.

3. The measuring apparatus according to claim 2, wherein the analyzing part further calculates a straight-line distance to the communication apparatus to be measured based on a medium speed as a signal propagation speed calculated based on a delay time measure between two positions, physical positions of which are known and a known straight-line distance between the two positions, and a delay time to the communication apparatus to be measured.

4. The measuring apparatus according to claim 1, further comprising an input part that receives a total number of probe packets and a capacity per probe packet.

5. The measuring apparatus according to claim 1, wherein the output part graphically illustrates arrangements of the measuring apparatus, the communication apparatus to be measured and the destination-communication apparatus, and displays numerically a result of the analysis of a buffer size or a line bandwidth of the communication apparatus to be measured calculated by the analyzing part.

6. The measuring apparatus according to claim 5, wherein the output part further determines schematized spacings between the measuring apparatus, the communication apparatus to be measured, and the destination-communication apparatus, according to a distance of each apparatus and RTT, and determines thickness and color of a line segment connecting the apparatuses each other according to a communication bandwidth between the apparatuses.

7. A method comprising:

transmitting probe packets to a destination-communication apparatus, through a communication path in which a communication apparatus to be measured is arranged, receiving response packets sent from the destination-communication apparatus when the probe packets arrive at through the communication apparatus to be measured, measuring time of probe packet transmission and time of reception of the response packet, calculating a packet response time by subtracting the time of reception of the response packet from the time of probe packet transmission; and outputting a result of the analysis calculated by the calculating, and wherein:

the measuring time comprises obtaining an elapsed time from start of a transmission of the probe packet, and the analyzing the response packet further obtaining a transmission transfer rate based on a RTT (Round Trip Time) based on the packet response time and based on the elapsed time, and calculating buffer size of the communication apparatus to be measured based on the transmission transfer rate, wherein the transmission transfer rate is calculated based on the RTT by obtaining distribution of the RTT per hour;

obtaining the minimum RTT interval (RTTmin) and the maximum RTT interval RTTmax);

obtaining Trttmin which is a time segment where RTTmin was last observed and Trttmax which is a time segment in which RTTmax was first observed, and calculating the difference $T_{range}$ between the two;

given are a capacity of one survey packet |P| [bytes] and number S of packets sent during Trange obtaining a transmission transfer rate [bytes/s] by calculating S÷Trange×|P|, and a buffer size of the communication apparatus to be measured is calculated by taking difference between a value obtained by multiplying the transmission transfer rate and the minimum RTT interval RTTmin and a value obtained by multiplying the transmission transfer rate and the maximum RTT interval.

8. The method according to claim 7, further comprising:

detecting packet loss, obtaining a time of detection of the packet loss; and calculating a RTT until the communication apparatus to be measured and a RTT from the communication apparatus to be measured to the destination-communication apparatus based on a loss rate calculated from quantity of packet loss and the detection time of the packet loss.

9. The method according to claim 7, further comprising calculating a straight-line distance to the communication apparatus to be measured based on a medium speed as a signal propagation speed calculated based on a delay time measure between two positions, physical positions of which are known and a known straight-line distance between the two positions, and a delay time to the communication apparatus to be measured.

10. The method according to claim 7, further comprising receiving a total number of probe packets and a capacity per probe packet.

11. The method according to claim 7, further comprising:

graphically illustrating arrangements of the measuring apparatus, the communication apparatus to be measured and the destination-communication apparatus, and displaying numerically a result of the analysis of a buffer size or a line bandwidth of the communication apparatus to be measured of the response packet.

12. The method according to claim 11, further comprising:

determining schematized spacings between the measuring apparatus, the communication apparatus to be measured, and the destination-communication apparatus, according to a distance of each apparatus and RTT, and determining thickness and color of a line segment connecting the apparatuses each other according to a communication bandwidth between the apparatuses.

13. A non-transitory computer-readable recording medium storing thereon a program configured to cause a computer to execute:

a process of transmitting probe packets to a destination-communication apparatus, through a communication path in which a communication apparatus to be measured is arranged;

a process of receiving response packets sent from the destination-communication apparatus when the probe packets arrive at through the communication apparatus to be measured;

a process of measuring time of probe packet transmission and time of reception of the response packet;

a process of calculating a packet response time by subtracting the time of reception of the response packet from the time of probe packet transmission; and a process of outputting a result of the analysis calculated by the process of calculating, and wherein:

the process of measuring time comprises obtaining an elapsed time from start of a transmission of the probe packet, and the process of analyzing the response packet further obtaining a transmission transfer rate based on a RTT (Round Trip Time) based on the packet response time and based on the elapsed time, and calculating buffer size of the communication apparatus to be measured based on the transmission transfer rate, wherein the transmission transfer rate is calculated based on the RTT by obtaining distribution of the RTT per hour;

obtaining the minimum RTT interval (RTTmin) and the maximum RTT interval (RTTmax);

obtaining Trttmin which is a time segment where $R_{TTmin}$ was last observed and $T_{rttmax}$ which is a time segment in which $R_{TTmax}$ was first observed, and calculating the difference $T_{range}$ between the two;

given are a capacity of one survey packet |P| [bytes] and number S of packets sent during $T_{range}$ obtaining a transmission transfer rate [bytes/s] by calculating S÷Trange×|P|, and a buffer size of the communication apparatus to be measured is calculated by taking difference between a value obtained by multiplying the transmission transfer rate and the minimum RTT interval RTTmin and a value obtained by multiplying the transmission transfer rate and the maximum RTT interval.

14. The medium according to claim 13, the program is configured to cause a computer to execute:

detecting packet loss, obtaining a time of detection of the packet loss; and calculating a RTT until the communication apparatus to be measured and a RTT from the communication apparatus to be measured to the destination-communication apparatus based on a loss rate calculated from quantity of packet loss and the detection time of the packet loss.

15. The medium according to claim 13, the program is configured to cause a computer to execute calculating a straight-line distance to the communication apparatus to be measured based on a medium speed as a signal propagation speed calculated based on a delay time measure between two positions, physical positions of which are known and a known straight-line distance between the two positions, and a delay time to the communication apparatus to be measured.

16. The medium according to claim 13, the program is configured to cause a computer to execute receiving a total number of probe packets and a capacity per probe packet.

17. The medium according to claim 13, the program is configured to cause a computer to execute:

graphically illustrating arrangements of the measuring apparatus, the communication apparatus to be measured and the destination-communication apparatus, and displaying numerically a result of the analysis of a buffer size or a line bandwidth of the communication apparatus to be measured of the response packet.

18. The medium according to claim 17, the program is configured to cause a computer to execute:

determining schematized spacings between the measuring apparatus, the communication apparatus to be measured, and the destination-communication apparatus, according to a distance of each apparatus and RTT, and determining thickness and color of a line segment connecting the apparatuses each other according to a communication bandwidth between the apparatuses.

\* \* \* \* \*